United States Patent [19]

Fillion

[11] Patent Number: 4,949,611

[45] Date of Patent: Aug. 21, 1990

[54] HYDRAULIC AND ELECTRICAL CIRCUITS FOR A HEAVY-DUTY SAW

[75] Inventor: Michael J. Fillion, Dearborn, Mich.

[73] Assignee: Steel Industries, Inc., Detroit, Mich.

[21] Appl. No.: 455,819

[22] Filed: Dec. 20, 1989

Related U.S. Application Data

[63] Continuation of Ser. No. 274,413, Nov. 21, 1988, abandoned.

[51] Int. Cl.$^5$ .......................... B26D 5/20; B26D 5/42
[52] U.S. Cl. ........................................ 83/221; 83/277; 83/282; 83/436; 83/639.5; 83/380; 83/399; 269/30; 269/222
[58] Field of Search ...................... 83/42, 62, 71, 247, 83/221, 277, 282, 801, 639, 436, 380, 399; 269/30, 34, 222, 153; 144/3 B, 242 R

[56] References Cited

U.S. PATENT DOCUMENTS

| | | |
|---|---|---|
| 1,850,331 | 3/1932 | Ohler . |
| 2,769,224 | 11/1956 | Hake . |
| 3,110,206 | 11/1963 | Hake . |
| 3,504,585 | 4/1970 | Harris . |
| 3,682,030 | 8/1972 | Harris . |
| 3,848,493 | 11/1974 | Harris . |
| 4,117,756 | 10/1978 | Harris . |

OTHER PUBLICATIONS

Instruction Book Entitled "Joh. Friedrich Ohler, Hydraulic Cold Sawing Machines, Saw Sharpening Machines, Segmental Saw Blades", for the Erection, Operation and Maintenance of Model KA-1000 Cold Sawing Machines With Serial Nos. 5893 and later, by James W. George Machinery Co. of Detroit, Michigan (pp. 1-50).

*Primary Examiner*—Frank T. Yost
*Assistant Examiner*—Scott A. Smith

*Attorney, Agent, or Firm*—Dykema Gossett

[57] ABSTRACT

In a heavy-duty saw assembly having a base, a pair of columns, a feed carriage guidably mounted upon the columns supporting a power-driven saw, a hydraulic lift feed cylinder assembly within each column and connected to the carriage, an elongated saw train extending at right angles to the base, including a plurality of transverse rollers, a sprocket chain connected to the rollers for selective rotation in unison for intermittently feeding an elongated workpiece onto the base transversely of and under the saw, spaced normally open rear and front hydraulic vises adjustably mounted upon the base adapted to selectively grip the work, and a pair of spaced manually rotatable lead screws journaled upon the base connected to the vises respectively, the improvement of a hydraulic circuit therefor which comprises first and second hydraulic circuits, first and second power-operated hydraulic pumps for feeding pressurized liquids into the circuits and a four-way, three-position, spring centered, solenoid-activated saw carriage feed first valve in the first circuit having an outlet connected to the lift feed cylinder assemblies for selectively raising and lowering the saw feed carriage. A reversible hydraulic motor having an output drive is connected to the sprocket chain; and a four-way, three-position, spring centered, solenoid-activated second valve in the first circuit has an output connected to the hydraulic motor. A two-position, four-way, spring offset, solenoid-operated third valve in the second circuit has an outlet connected to the rear vise, and the saw carriage being initially retracted, activation of the second four-way valve and hydraulic motor first actuates the rollers. Activation of the third valve closes the rear vise upon the work and successive actuation of the first valve actuates the cylinder assemblies for feeding the saw to and through the work.

37 Claims, 8 Drawing Sheets

HYDRAULIC AND ELECTRICAL CIRCUITS FOR A HEAVY-DUTY SAW

This is a continuation of copending application Ser. No. 07/274,413 filed on Nov. 21, 1988 now abandoned.

FIELD OF THE INVENTION

The invention relates to a known heavy-duty saw for feeding, gripping and cutting lengths of metal workpieces and more particularly to a hydraulic and electrical circuit for a heavy-duty saw.

BACKGROUND OF THE INVENTION

A construction and operation of the present heavy-duty saw is recognized as reasonably old and well known and has been on the market for many years providing a series of precision made parts and assemblies which heretofore have been available on the market.

The present invention is directed to a heavy-duty saw having a number of conventional parts including a base, columns, saw feed carriage, power driven saw rotatable on a horizontal axis, the hydraulic lift feed cylinder assembly within each column connected to the carriage and a saw train extending at right angles to the base. The saw train includes a plurality of spaced transverse rollers and employs a continuous sprocket chain connected to the rollers for selective rotation in unison for intermittently feeding an elongated workpiece onto the base transversely of and under the saw. The saw construction includes spaced normally open rear and front vises adjustably mounted upon the base rearwardly and forwardly of the saw, respectively, adapted to selectively grip the work. Additionally included are a pair of spaced manually rotatable lead screws journaled upon the base and connected to the vises respectively.

SUMMARY OF THE INVENTION

An important feature of the present invention is to provide for a heavy-duty saw an improved hydraulic circuit for controlling the movements of a plurality of hydraulic cylinders and hydraulic motors together with a plurality of control valves regulating the operation of such cylinders and motors including the rear vise and front vise.

As another feature of the present invention there is disclosed herein an improved electronic circuit for the manual or automatic operation of the present heavy-duty saw and wherein various types of electrical interlocks are incorporated into the circuit to assure the progressive operation of the respective components of the saw in a manner which renders the saw efficient.

Another feature of the present hydraulic circuit includes a pair of circuits, one of which is utilized for moving a feed cylinder for feeding a saw carriage towards and away from a workpiece retained by front and rear vises upon a bed, together with pressurized fluid for operating a hydraulic motor controlling the operation of the saw train.

As another feature there is incorporated within the second circuit a plurality of solenoid controlled valves in conjunction with cylinders to selectively control the operation of a rear vise, a front vise and a lift cylinder, with the solenoids arranged in an electrical circuit with suitable protective interlocks therebetween, to assure a proper order of operation.

An important feature is to provide in conjunction with said hydraulic circuits a plurality of four-way three-position solenoid controlled valves for regulating the flow of hydraulic fluid under pressure to the cylinders which control the saw carriage and hydraulic motor for the saw train, together with additional solenoids for controlling the operation of spring biased two-position solenoid control valves for controlling the operation of the rear vise, the front vise and a lift cylinder.

An important feature of the present invention is to provide for a hydraulic circuit such as for the automatic operation of the present heavy-duty saw wherein there are a plurality of four-way three-position solenoid operated flow control valves which control the operation of the saw carriage; the hydraulic motor for controlling the saw train, which controls the operation of an automatic feed carriage; together with automatic hydraulic working gripping vises thereon; together with a plurality of two-way two-position solenoid control valves for regulating a rear vise, a front vise and a lift cylinder; together with additional solenoid controlled valves operating cylinders for a front vise adjustment, a rear vise adjustment, a front roller drive and a rear roller drive all under the control of a hydraulic motor in cooperating hydraulic and electrical circuits.

These and other features and objects will be seen from the following specification and claims in conjunction with the appended drawings.

DRAWINGS

Figure 1:
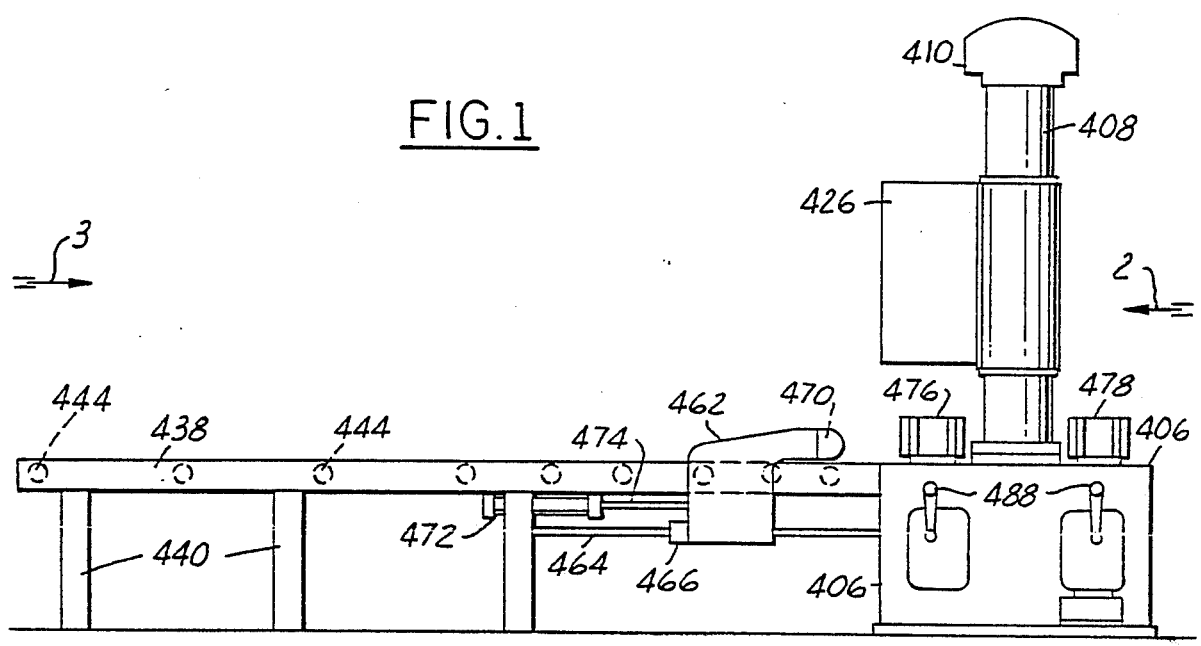
FIG. 1 is a side elevational view of the present heavy-duty saw.

It will be understood that the above drawings are illustrative of a preferred embodiment of the invention, and that other embodiments are contemplated within the scope of the claims hereafter set forth.

DETAILED DESCRIPTION OF AN EMBODIMENT OF THE INVENTION

The present heavy-duty saw 402, FIGS. 1–5, is sometimes referred to as the Ohler saw and was the original development of a German inventor Joh. Friedrich Ohler of Germany. The present heavy-duty saw includes a base 406 mounted upon a suitable flooring 404, preferably a concrete foundation, and suitably anchored thereto.

Secured upon base 406 are a pair of laterally spaced upright guide columns 408 mounting a cross-beam 410 at their upper ends. Automatic saw feed carriage 412 is slidably and guidably mounted upon the respective columns 408 and is under the control of the corresponding hydraulic lift feed cylinder assemblies shown in FIG. 5. Such cylinder assemblies includes a pair of hydraulic lift cylinders 414 nested within the base 406, including reciprocal piston rods 416 which extend up into the corresponding columns 408 which are joined to opposite side portions of the saw carriage 412 by the connectors 418.

Figure 3:
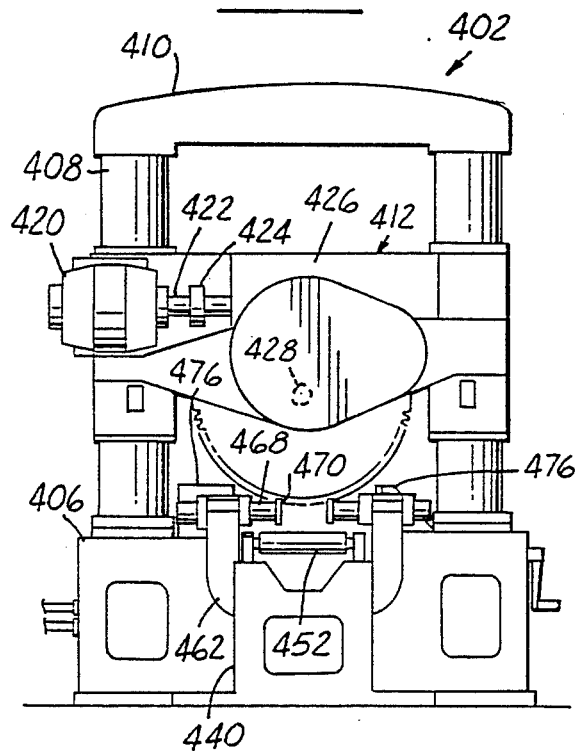
FIG. 3 is a fragmentary end elevational view taken in the direction of arrow number 3 in FIG. 1.
Figure 2:
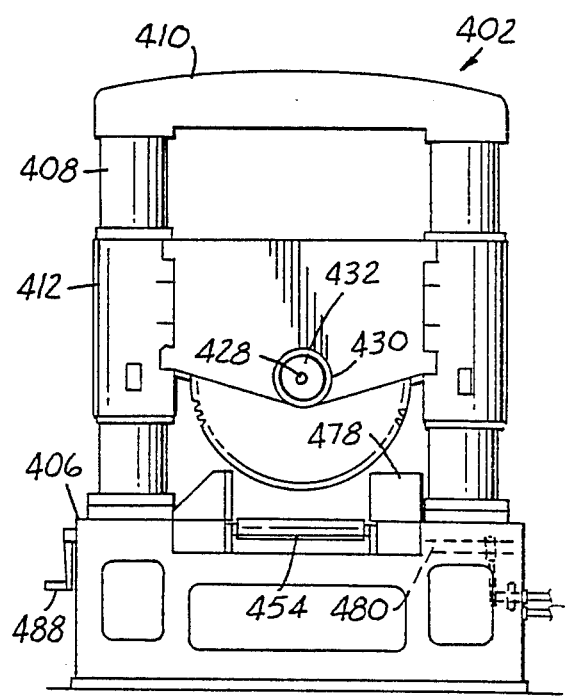
FIG. 2 is an end elevational view taken in the direction of arrow number 2 in FIG. 1.

From the rear side of the heavy-duty saw 402, FIG. 3, there is shown an electric motor 420 mounted and secured upon carriage 412 which includes output shaft 422 coupled at 424 to the transmission 426 mounted and supported upon saw feed carriage 412. The transmission includes a series of reduction gears which terminate in the drive shaft 428, FIGS. 2, 3 and 5. Shaft 428 is arranged upon a horizontal axis and is journaled within the outboard bearing 430, FIG. 2.

Figure 5:
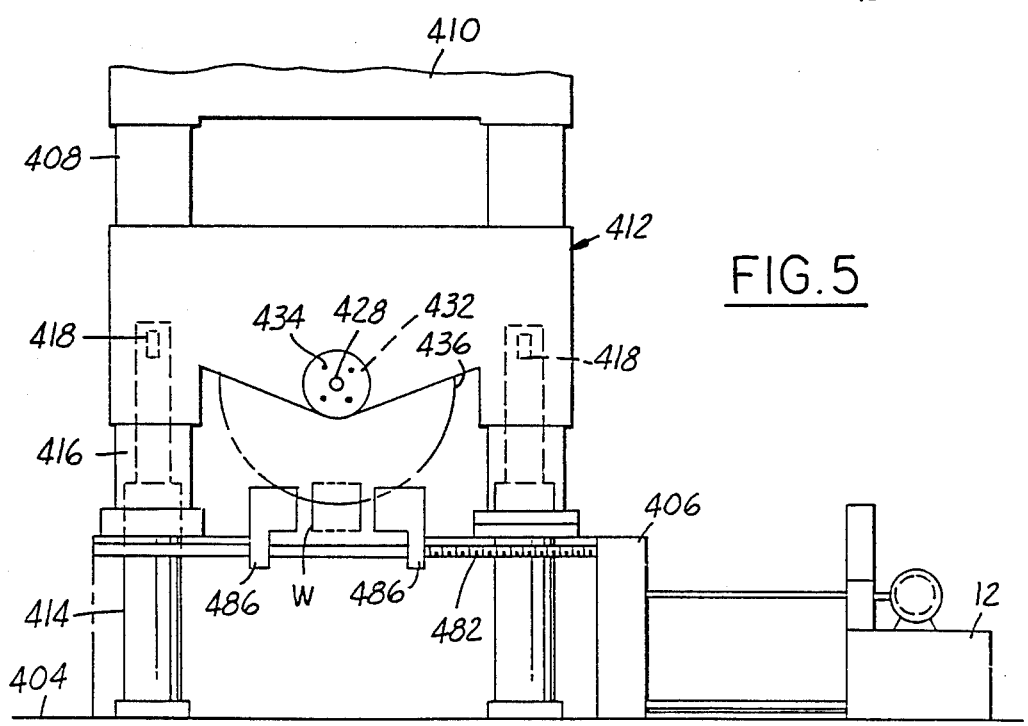
FIG. 5 is a fragmentary front elevational view of the heavy-duty saw shown in FIG. 4.

The power driven arbor 432 is journaled within bearing 430 and includes a plurality of axially extending drive pins 434 which extend within corresponding apertures formed within the rotary saw blade 436, FIG. 5, for supporting and mounting saw blade 436 for rotation in a vertical plane.

Continuing with the conventional construction of the heavy-duty saw 402, there is provided a roller track including a pair of laterally spaced parallel side rails 438 which are mounted upon the supports 440, FIG. 1. The side rails provide the roller train 442 which extends at right angles to the base 406 of the heavy-duty saw 402 and is suitably secured thereto, FIG. 4.

The roller train 442 includes a plurality of transverse longitudinally spaced feed rollers 444 whose ends are journaled as at 446 upon the respective roller tracks 438 and have secured thereto at their one ends a plurality of sprocket gears 448. An elongated continuous sprocket chain 450 is provided for the rollers 444 which extends over the corresponding sprockets 448, including the sprockets upon the one ends of the pair of spaced rear rollers 452 shown in FIG. 4. These rollers are additionally journaled upon the roller tracks 438 and are driven by the same sprocket chain 450 as the corresponding roller train rollers 444.

Arranged upon and spaced from the saw blade 436 forwardly thereof are a pair of parallel spaced front rollers 454 journaled at their ends upon the corresponding roller supports 456. Rollers 454 with corresponding sprockets are interconnected for rotation in unison by the drive chain 450, FIG. 4, and are connected to drive shaft 460 journaled upon the base 406.

In the operation of the present roller train 442, an elongated workpiece W, which may be circular, square or rectangular in cross section centrally overlies the rollers 444 of the roller train transversely there of and upon rotation thereof is adapted to be fed by the rollers 444 in a path centrally of the roller train 442 over the corresponding rollers 444, over the rear rollers 452 into the rear vise 476 which overlies the base 406, and usually into the front vise 478.

There is further provided upon the roller train 442 an automatic feed carriage 462 which is reciprocally mounted upon and over the roller tracks 438 and guidably supported upon a pair of guide support rods 464, FIG. 1, with suitable bearings interposed. One or a pair of stops 466 mounted upon rearward portions of the feed carriage 462 for limiting retracting movements thereof.

Figure 9:
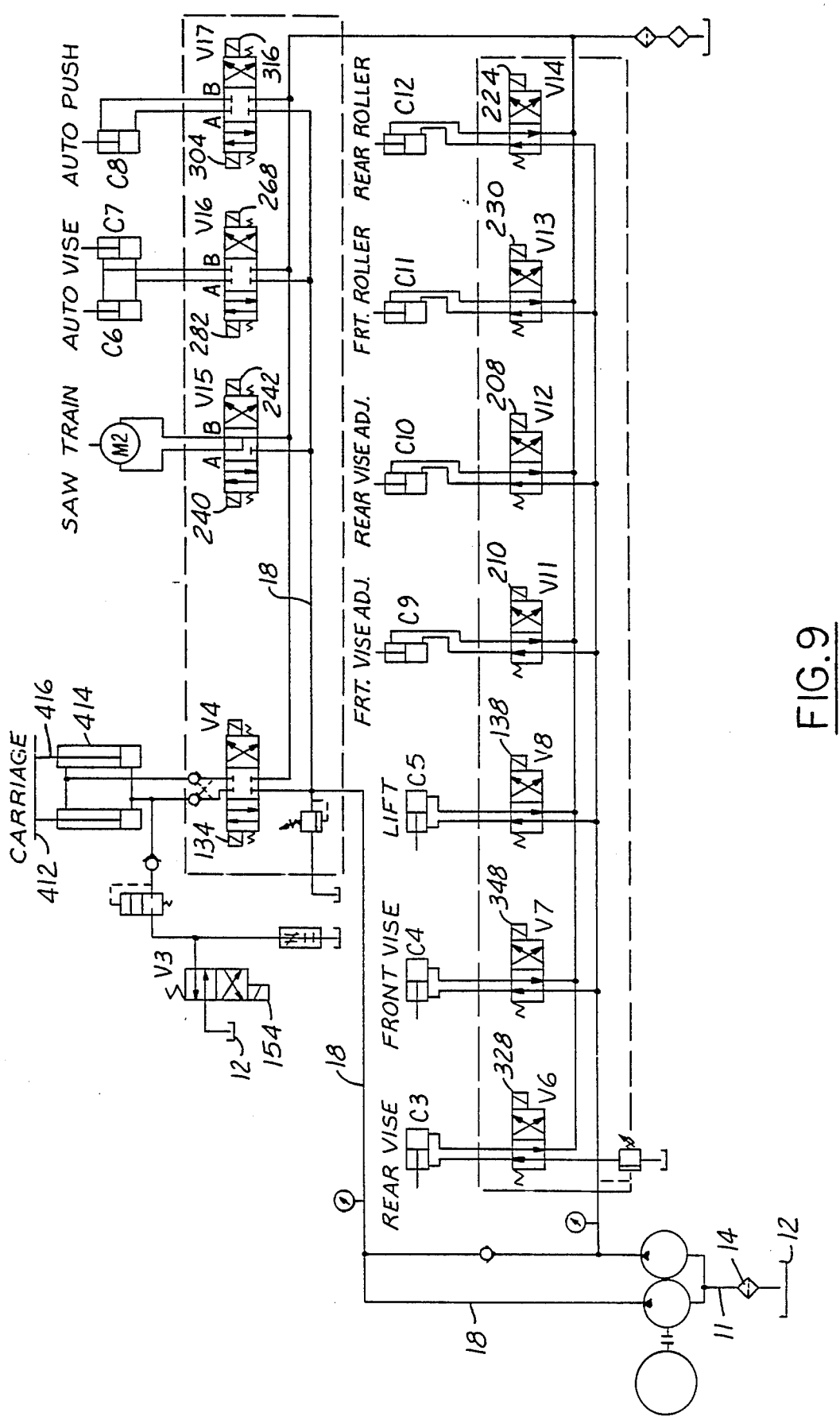
FIG. 9 is a schematic hydraulic circuit which corresponds to the electrical circuit illustrated in FIGS. 8A, 8B and 8C.

Overlying the respective roller tracks 438 and mounted upon the forward end of the feed carriage 462 are a pair of opposed hydraulic feed cylinders or vise 468 which correspond to the vise C6 and C7 schematically shown in FIG. 9, and identified as AUTO VISE. Each of the respective cylinders 468 include a reciprocal piston rod mounting on its outer end a workpiece 470 or tang which is positioned over the feed rollers 444 and is adapted to operatively grip opposite side portions of the workpiece W.

Figure 4:
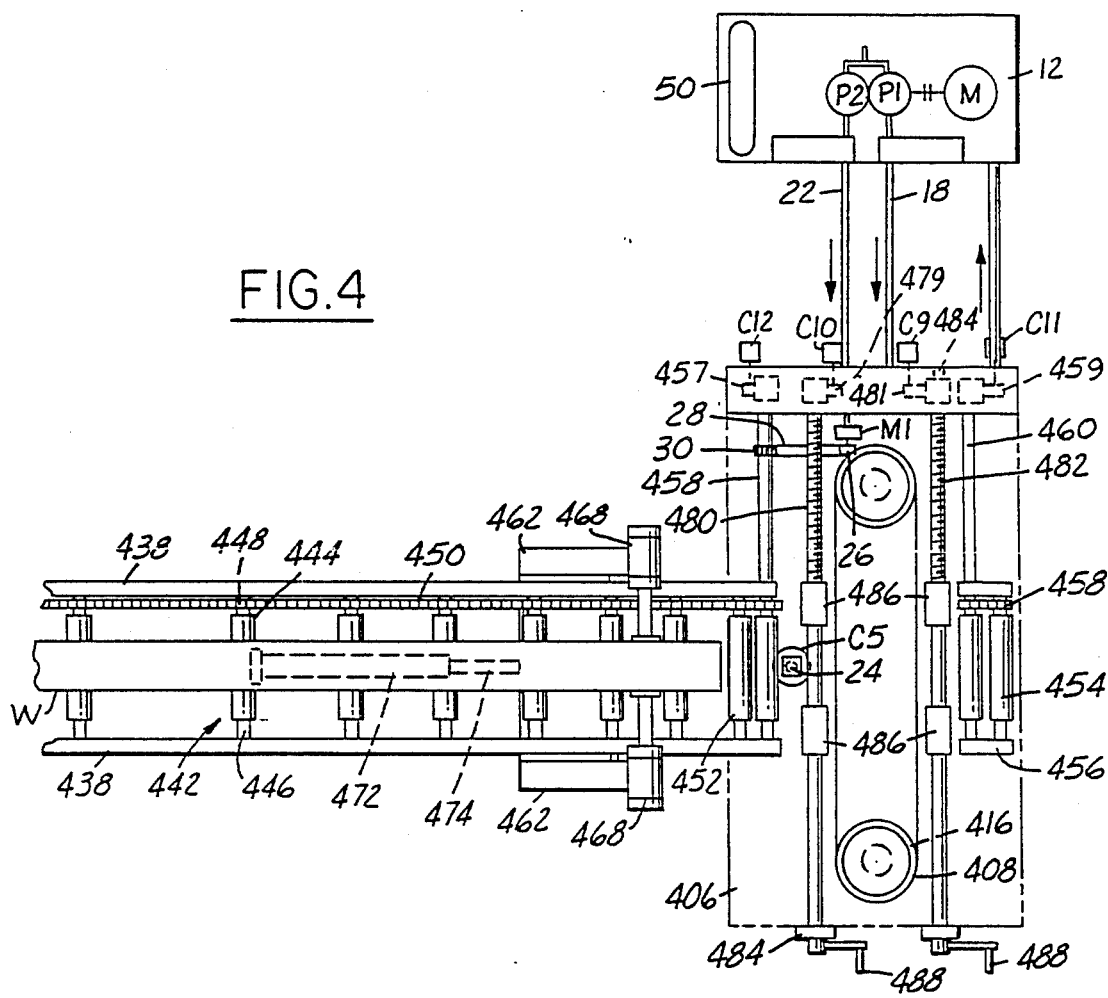
FIG. 4 is a plan view of the heavy-duty saw shown in FIG. 1.

Hydraulic feed cylinder 472 underlies the roller train 442 and is secured thereto and includes a reciprocal piston rod 474 at its outer end connected centrally of the automatic workpiece feed carriage 462. The carriage 462 has an advance feed position of feeding the workpiece W over the rollers 444 centrally thereof, over the rear rollers 452 preferably through both of the rear and front vises 476 and 478 as schematically shown in FIGS.1 and 4, and onto front rollers 454.

Figure 7:
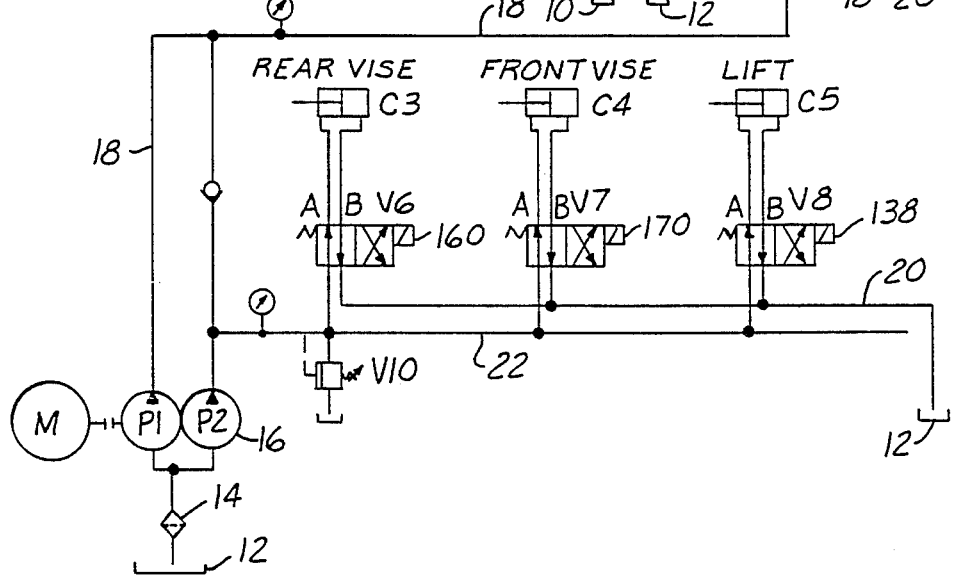
FIG. 7 is a schematic hydraulic diagram of the simplified hydraulic circuit corresponding to FIGS. 6A and 6B.

Rear vise 476 mounts a cylinder C3 such as shown in FIG. 7, with clamping upon opposite sides of the workpiece W. Front vise 478 includes work gripping cylinder C4, schematically shown in FIG. 7, and further shown and identified as C3 and C4 in FIG. 9.

Mounted upon the base 406 and extending transversely of the roller train 442 are a pair of oppositely threaded vise screws 480 and 482 suitably journaled such as at 484 upon the base 406. Threaded upon each of the oppositely threaded portions of the corresponding screws 480 and 482 are a pair of upright vise nuts 486. There are two vise nuts for the rear vise 476 and a pair of vise nuts 486 for the front vise 478. Each of the respective vise screws 480 and 482 terminate at their one ends in the hand cranks 488 as providing one means for inward and outward adjustment of the corresponding rear and front vises selectively. Initial setting of the vises may be desired such as retracting the vises to a position so that the workpiece W is initially clear for projection between the vises.

As hereafter described by the hydraulic and electrical circuits provided therefor feed carriage 462, after gripping the work W at 468, 470 feeds forwardly so as to position the work W under the saw blade 436, for a predetermined cut-off length.

HYDRAULIC CIRCUIT

Referring to FIG. 7, a hydraulic tank or reservoir is designated at 12 filled with oil. Intake pipe 11 includes filter 14 and is connected to pump P1 and pump P2 identified as a double pump 16, sold by Vickers Corporation, and is connected to an electric motor M, in the illustrated embodiment rated 10 horsepower. Pump P1 has an outlet conduit 18 forming a part of a first circuit which extends to the adjustable pressure relief valve V9, in the illustrated embodiment set for a pressure of 750 to 1,000 PSI. Pump P2 has an outlet 22 forming part of a second hydraulic circuit and is connected to the adjustable pressure relief valve V10, which in the illustrative embodiment has been set at 500 PSI. V4 is a saw carriage feed valve referred to as a three-position four-way valve spring centered and solenoid activated as by the pair of solenoids 118 and 134. Solenoids 118 and 134 are for controlling the flow of pressurized hydraulic fluid from pump P1 through either of the outlets A or B selectively. Valve V4 has a center block port position and two other positions. Depending upon the energization of the respective solenoids valve V4 feeds hydraulic liquid to one end or the other of the corresponding lift cylinders 414, schematically shown in FIG. 7. Cylinders 414 are connected to the saw feed carriage 412, fragmentarily shown. Exhaust conduit 20 from the valve V4 returns to tank 12 as schematically shown. The respective outlet conduits from valve V4 include a pair of flow check valves V20.

Saw train control valve V5, FIG. 7 is a three position four-way valve spring centered and solenoid actuated as by the solenoids 140 and 146. Valve V5 controls the flow of hydraulic liquid in the first circuit from conduit 18 for direction to the saw train hydraulic motor M1 mounted within the saw base 406, FIG. 4. As hereafter described, the output shaft of the hydraulic motor M1 as rotatably driven will act through a first sprocket gear 26, sprocket chain 28 and sprocket gear 30 for rotatively driving shaft 458, which is drivably connected to sprocket chain 450 of roller train 442.

The valve V2, FIG. 7, is a two-position two-way valve with a pilot operation shown in dash lines and with a spring off-set sometimes referred to as a counter balance valve to hold the saw carriage 412 up when the said valve is in a neutral position as shown in the drawing and to create a back pressure on the cylinders 414 preventing the carriage 412 and saw 436 from dropping rapidly. Valve V2 further provides for a constant downward feed of the saw carriage 412 and the connected saw.

It is seen that with the hydraulic liquid delivered through the port B to cause downward feeding of the carriage 412, exhaust hydraulic fluid from the opposite ends of the respective cylinders 414 are blocked at valves V20 and normally would be blocked at valves V2. As the pressure of the hydraulic fluid builds up pilot operation takes effect retracting the movable member of valve V2 against its spring, schematically shown so that the exhaust from valve V2 may pass selectively either through valve V1 or valve V3, FIG. 7.

Valve V1 is a variable flow control valve, and is temperature and pressure compensated to create a back pressure also upon the cylinders 414 for a more finer control of the carriage movements including the feed cylinders.

Valve V3 is a two-position four-way valve which is spring off-set and solenoid activated as by solenoid 154 for bringing the carriage 412 down at a rapid rate without back pressure, as schematically shown with exhausting hydraulic fluids passing to the reservoir 12 at the upper side of valve V3, FIG. 7.

Valve V6, FIG. 7, is a two-position four-way spring off-set solenoid operated valve under the control of solenoid 160 connected to the second hydraulic circuit under the control of the pump P2 which through the conduit 22 controls rear vise cylinder C3. Valve V7 is a two-position four-way spring off-set solenoid operated valve controlled by the solenoid 170 for controlling the front vise cylinder C4.

The rear vise 476, which mounts cylinder C3 is electrically interconnected with valve V4 for the saw carriage 412 and with the valve V5 for motor MI and the saw train 442. The rear vise cylinder C3 must be open for the saw train motor M1 to be activated through valve V5.

The rear vise 476 is then clamped to the work W and is electrically interlocked with valve V4 for the saw carriage 412, which can't operate unless the rear vise cylinder C3 is in a clamped mode relative to the work W.

Valve V8 is a four-way spring biased solenoid activated valve connected to hydraulic line 22 in the second hydraulic circuit and normally controlled by the solenoid 138. Valve V8 controls the operation of the lift cylinder or lift roller C5 further shown in FIG. 4. Lift cylinder C5 controls the elevation of a lift roller or piston rod 24, FIG. 4. It may be desired to elevate the forward end of the workpiece W in order to assist in its clearance into the corresponding vises 476 and 478. This occurs when the forward end for one reason or another is out of round or has excess metal thereon so that such excess metal is in the normal path and prevents entry of the workpiece into the respective vises.

MODIFIED HYDRAULIC CIRCUIT

A modified hydraulic circuit is shown in FIG. 9, which incorporates some of the illustration shown in FIG. 7, but expands beyond it and includes additional hydraulic cylinders and control valves. Referring to FIG. 9, shown at V15 is the adjust motor control valve which is a three-position four-way spring biased solenoid operated center blocked valve controlled by the solenoids 240 and 242. Valve V15 has a center blocking position and includes as do all of the respective cylinders and valves, the A and B ports. Valve V15 controls the operation and direction of rotation of the output shaft of the hydraulic motor M2 designated and shown schematically in FIG. 9 as connected to the saw or roller train, being the roller train 442 of FIG. 4.

On energization of the motor M2 in one direction or the other, the output shaft of motor M2 is adapted to connect the corresponding sprocket 26, sprocket chain 28 and sprocket 30 upon the elongated shaft 458 which drivingly connects the sprocket chain 450 of the roller train 442. In FIG. 4, the gears are shown connected to motor M1. In the embodiment, disclosed with respect to FIG. 9, motor M1 is replaced by motor M2. Depending upon which of the pair of solenoids 240 or 242 are activated, the roller train 442 will be fed forwardly or rearwardly, as for example advancing the elongated workpiece W towards the base 406 of the saw 402 so as to underlie the saw blade 436 of FIG. 5.

Front vise adjust cylinder C9 is schematically shown in FIG. 9. Cylinder C9 has a reciprocal rod, which is connected to a power driven sprocket gear 481, moving upon the output shaft of the hydraulic motor M2, moving such sprocket gear into driving engagement with the feed screw 482, shown in FIG. 4, opening or closing the front vise adjust cylinder C9.

There is shown at C10 a rear vise adjust cylinder under the control of valve V12 and the corresponding solenoid 208 is adapted to advance a power driven sprocket 479 here connected to hydraulic motor M2 so as to be in driving engagement with the elongated screw 480 for operating the rear vise adjust through the screw 480. This provides additional feed movement of the rear vise 476 so as to move further inwardly over and beyond what might be accomplished by the basic rear vise C3 or the basic front vise C4. The basic rear vise C3 and front vise C4 may have an initial feed movement of approximately 4 inches, for example, which is effective for a large diameter workpiece. In the event that the workpiece is of a reduced diameter, in addition to the use of the front and rear vises C3 and C4, the front vise adjust C9 and rear vise adjust C10 are employed. This increases the inward feed movements of the corresponding vises 476 and 478 by the operation of the corresponding screws 480 and 482, FIG. 4.

Cylinder C11 is provided for the control of the front rollers 454, FIG. 4, as shown in FIG. 9, under the control of the valve V13 and its solenoid 230, FIG. 4. Control of the cylinder C11 establishes a sprocket drive 459 to a shaft 460, which drives the interconnected front rollers 454 for rotation in unison and under the control of solenoid 230. Cylinder C12 is adapted for the control of the drive of the rear rollers 452, FIG. 4. Cylinder C12 includes a reciprocal piston rod which moves a power driven sprocket gear 457 into mesh with the corresponding sprocket gear located upon the drive shaft 458, which is connected to the rear rollers 452 for rotation in unison. Cylinder C12 is under the control of the valve V14 and its solenoid 224, FIG. 9.

The adjust motor M2, FIG. 9, has a rotatable output shaft upon which are splinded a series of sprocket gears 457, 459, 479 and 481, FIG. 4, which are under control of the respective cylinders C12, C11, C10 and C9. The sprockets located are advanced into driving engagement with corresponding sprockets upon the corresponding drive shafts 458 and 460 and the threaded shafts 480 and 482.

The respective valves V6, V7, V8, V11, V12, V13 and V14 are all two-position four-way valves, spring off-set and solenoid operated. Their respective valves are controlled by the solenoids 328, 348, 138, 210, 208, 230 and 224 respectively shown in FIG. 9. These valves are associated with the corresponding cylinders C3, C4, C5, C9, C10, C11 and C12, respectively.

OPERATION

In operation, FIG. 7, pressurized oil or hydraulic fluid is pumped at P1 and comes to relief valve V9 set at 750 to 1,000 PSI, for protection of the system from any overload. Pressurized hydraulic fluid is directed to valve V4 for controlling the operation of the carriage feed cylinders 414. Valve V5 is used to control the operation of hydraulic motor M1, referred to as SAW TRAIN in FIG. 7. The saw train is used to move the steel work W which is on the saw train to place the steel in the position for cutting under saw blade 436. Motor M1 drives one of the rollers 452, FIG. 4, and the rest of the rollers are connected by a sprocket chain 450 one after another.

Valve V4 has a blocked port in the center, a neutral position, and a pair of outlet ports A and B. Such outlet ports A and B are characteristic of each of the respective valves shown in FIGS. 7 and 9.

Valves V4 and V5 are both spring centered valves which are solenoid activated to shift the valve to either position of the left or the right to change the flow of oil going from the pressure port to either A or B or from the tank port to A or B. Valves V20 are flow check valves to keep oil froming coming back through valve V4 when it is not required that the oil come back through V4 but is needed to go through the rest of the circuit including, cylinders 414, the valves V2, V3 and V1.

The two cylinders 414 are retained inside the saw columns 408 and are used to hold the carriage 412 up and to move the carriage 412 down into the steel W with the carriage 412 holding the saw blade 436 which rotates and is driven by motor 420 and the output shaft 428 of the transmission 426.

Valve V2 is a two-position two-way valve with a pilot operation with a spring off-set on it which is used as a counter balance valve to hold the carriage 412 up, FIG. 7, and to create back pressure on the cylinders 414 preventing the cylinders from dropping rapidly and to help keep a constant feed on the saw blade 436.

Valve V1 is a variable flow control valve which is temperature and pressure compensated. The pressure compensated part of the valve is used for creating back pressure also on the cylinders 414 for finer control of the carriage 412.

Valve V3 is a two-position four-way valve which is spring off-set and solenoid activated at 154. Valve V3 is used to bring the carriage 112 down at a rapid rate without the back pressure of valve V1 and the restrictions in valve V1.

The hydraulic circuit through pump P2, which is set at approximately 500 PSI, through valve V10 delivers pressurized oil to the valve V6 which is a two-position four-way spring off-set valve operated by solenoid 160. Valve V6 controls cylinder C3 which is the rear vise cylinder and corresponds to the rear vise 476 shown in FIG. 1. The rear vise cylinder C3 is electrically interlocked with valve V4 for the saw carriage 412 and valve V5 for the saw train. The rear vise cylinder C3 must be open for the saw train motor M1 to be activated through valve V5. Then the saw or roller train 442 can move the steel W through the vise or vises 476 and 478. The rear vise 476 must then clamp the steel W and is electrically interlocked with the carriage 412 which is connected to cylinders 414 and which cannot be activated through valve V4 unless the rear cylinder C3 is in a clamped mode.

If the option is utilized to render the saw automatic with automatic adjustments, then the motor M1 of FIG. 7 is replaced by the motor M2 shown in the schematic diagram, FIG. 9. In that situation, valve V15 replaces valve V5 of FIG. 7.

For a circuit which employs control only of the carriage 412, FIG. 7, the saw or roller train 442 of FIG. 4, and the rear vise cylinder C3 corresponding to rear vise 476, FIG. 1, then motor M1 would be employed in the circuit shown in FIG. 7.

Referring to FIG. 9, as pressurized hydraulic oil from pump P1 is directed through the line 18 it passes the relief valve V9 before coming to valve V15 which is the adjust motor control valve for the corresponding hydraulic motor M2. The valve V15 is a three-position four-way valve with a blocked center port and pressure ports A and B open to tank and a spring centered solenoid actuated valve including the solenoids 240 and 242. Adjust motor M2 is used in combination with front vise adjust cylinder C9, rear vise adjust cylinder C10, front roller control cylinder C11 and rear roller control cylinder C12 and in the control of the saw train 442, FIG. 4.

One of the options of the present heavy-duty saw is the use of the control cylinder C9, C10, C11 and C12 which would be activated through their corresponding control valves V11, V12, V13 and V14 in conjunction with the operation of control valve V15 which activates the adjust motor M2 for drive in one of two directions.

The adjust motor M2 drives a series of chains and sprockets which are maintained within the saw base 406 and will automatically operate. Cylinder C9 will shift a gear 481 to adjust the front vise 478 for in and out adjustment relative to the work W. Cylinder C10, FIG. 4, will shift a gear 479 which will allow the adjust motor M2 to move the rear vise 476 in and out for a closer adjustment.

As shown in FIG. 9, rear vise cylinder C3 has a travel of about 3 inches. The saw will accommodate between the vises 476 and 478 an opening from 0 to 16 inches. Since vice cylinders C3 and C4 will not move that much, the rear vise adjust including cylinder C10 and the front vise adjust including cylinder C9, FIG. 9, are used to bring the physical vises 476 and 478 in closer to the workpiece W to get within 1 inch or less for gripping such workpiece. The rear vise 476 is basically used for gripping the work W and the front vise and rear vise adjusts bring the vises closer together as needed.

Cylinder C11, FIGS. 4 and 9 controls movement of the front rollers 454 shift gear 459 as schematically shown in FIG. 4. Gear 459 is slidable upon the output shaft of the adjust motor M2 to rotate the front rollers 454 on the saw base 406 for unloading a cut piece of steel W after it has been cut. The rear roller control cylinder C12 is used to bring a shorter piece W into the saw in order for it to be cut. The saw or roller train 442 stops at the base 406 of the saw 402. Thus the rear rollers 452 are used between the blade and the edge of the saw base to bring the smaller pieces of work underneath the saw blade 436. The saw or roller train 442 will move automatically with either the front or rear rollers or both. The hydraulic motor M2 is used to operate the saw train such as by the sprocket gear 26, chain 28 and sprocket gear 30 upon shaft 458, FIG. 4. Motor M2 also controls front vise 478, the rear vise 476, the front rollers 454 and the rear rollers 452.

The above described mechanical connection between the adjust motor M2 and the saw train 442 on the rear of the saw includes the sprocket chain 450, FIG. 4.

The front vise C4 is activated by valve V7 and its solenoid 348. Front vise is used to grip the piece of steel W which has been cut off of a larger piece to keep it from falling into the saw blade 436 after the cut is finished. Front vise has interlocks namely electrical interlocks so that the saw train cannot be moved forward until the front vise is opened. Thus, a workpiece cannot be moved on the saw train 442 until the front vise C4 is open. The same applies to rear vise C3.

Saw carriage 412 which is operated by the cylinders 414, FIG. 7, cannot move down until the front vise cylinder C4 is closed. The same applies to rear vise cylinder C3.

Cylinder C5, shown as a lift cylinder in FIGS. 7 and 9, is operated by valve V8 which is a two-position four-way spring off-set valve operated by the solenoid 138. It is used in conjunction with the saw or roller train 442 when there is a piece of steel W being brought towards the saw and there is a misalignment or for some reason the piece of steel W is crooked or will not lift onto the saw base rollers or onto the vises 476. Activating the valve V8 through solenoid 138 it will feed pressurized hydraulic oil into the lift cylinder C5 which through its piston rod 24, FIG. 4, lifts the piece of steel W higher than the vises. Then it can be fed into the vises and lowered and clamped by the vise cylinders C3 and C4 and thereafter the saw carriage 412 is moved downwardly so that the saw 426 transversely cuts the workpiece W.

When the saw is under automatic operation there are employed a pair of opposed cylinders C6 and C7, which are referred to as AUTO VISE in FIG. 9, mounted upon the automatic workpiece feed carriage 462 and driven by the hydraulic cylinder 472 (FIG. 4) schematically shown in FIG. 9 as AUTO PUSH cylinder C8.

The automatic option for the saw is employed where it can be determined a predetermined length of workpiece is to be cut into numerous pieces anywhere from 2 inches to any amount up to 16 inches. With the automatic option the feed carriage 462 of FIG. 1 is reciprocally mounted over the roller train 442 and used for clamping the workpiece W employing the auto vise cylinders C6 and C7 and then under the control of the cylinder C8, shown as cylinder 472 in FIG. 1, moving it forward underneath the saw blade 436 to a predetermined length.

The auto vise cylinders C6 and C7 are mounted upon the automatic carriage 462 overlying the saw or roller train and are operated by the valve V16, FIG. 9. Valve V16 is a three-position four-way valve with a block center and spring centered solenoid operated valve employing the solenoids 268 and 282. When the power saw is in automatic mode the valve V16 will shift closing the auto vise cylinders C6 and C7 clamping the steel W. After the steel has been clamped the AUTO PUSH cylinder C8, will push the saw carriage 462 on the train forward underneath the saw blade 436. This is accomplished by the valve V17 which is a three-position four-way blocked center valve, spring centered and controlled by the solenoids 304 and 316. In one position of the valve V17 the carriage 462 will move forward and locate the steel W underneath the saw blade. After the steel is underneath the saw blade, the vise cylinders C3 and C4, will close onto the steel W. The cylinders C6 and C7 on the auto vise will open through the valve V16 when shifted. The cylinder C8 will retract through valve V17 being shifted only when the auto vise cylinders C6 and C7 are fully open.

With the basic circuit using the saw train motor M1 with cylinders 414 moving the saw carriage 412, and the rear vise cylinder C3 there is the option of adding the front vise cylinder C4 without adding any other options. Further, the AUTO VISES cylinders C6 and C7, FIG. 9 with the AUTO PUSH cylinder C8 are used together with the main circuit including the saw train motor M1. Alternatively, you can employ the rear vise cylinder C3 and the front vise cylinder C4 with the auto vise cylinders C6 and C7 and the auto push cylinder C8, FIG. 9.

With the automatic circuit FIG. 9, motor M2 is used as the adjust motor employing options including the front vise adjust cylinder C9, the rear vise adjust cylinder C10, front roller control cylinder C11 and the rear roller control cylinder C12. There are used as an option including the adjust motor M2 which replaces the M1 saw train control of FIG. 7 which is removed from the circuit. The adjust motor M2 can control the saw train through sprocket gears 26 and 30, chain 28, drive shaft 458 and sprocket chain 450, FIG. 4.

ELECTRICAL CIRCUIT

Figure 6A:
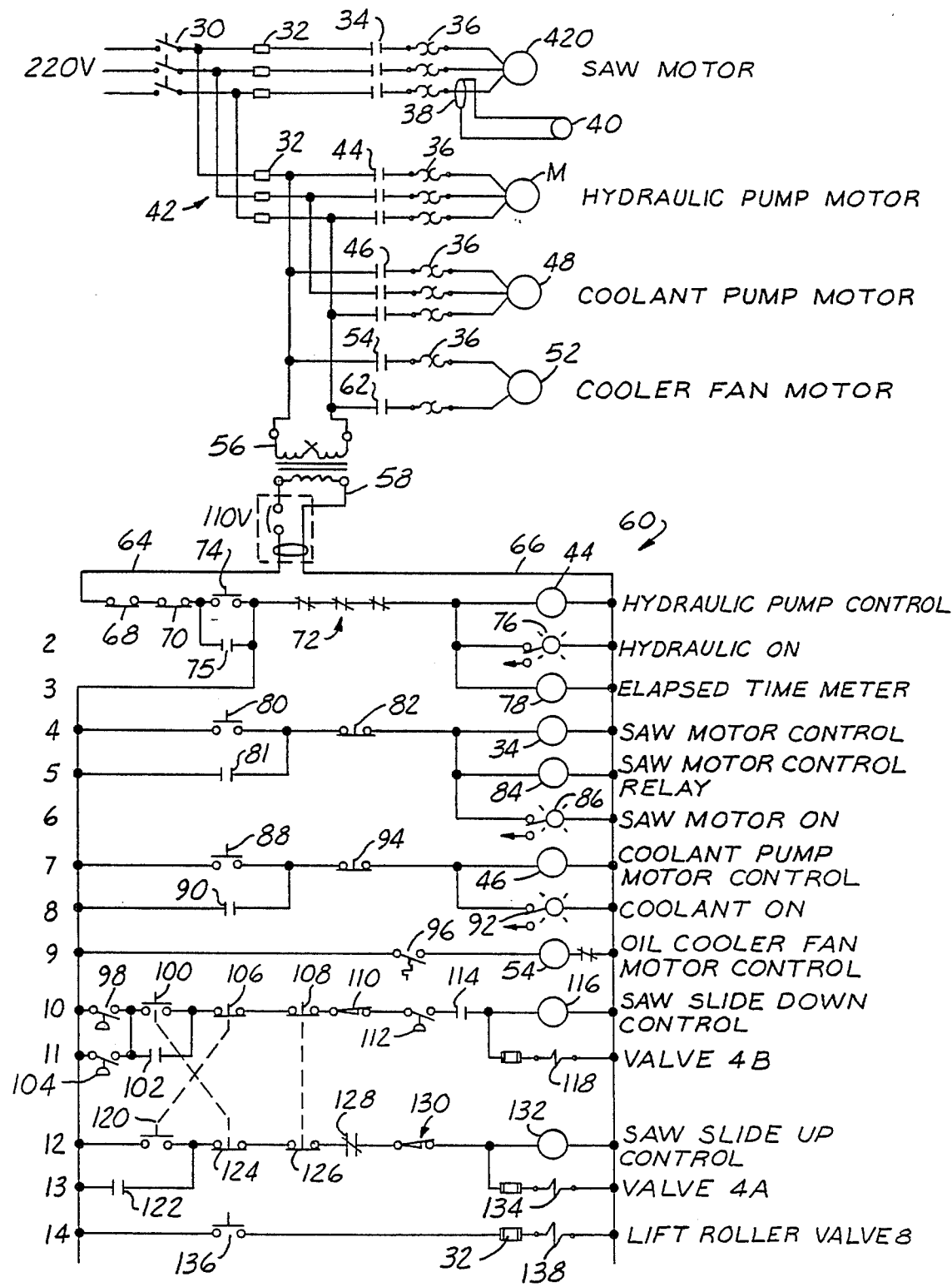
FIG. 6A is a fragmentary and schematic electrical diagram of a portion of the simplified electrical circuit for the heavy-duty saw with the consecutively numbered lines at the margin provided for identification of the circuit components.
Figure 6B:
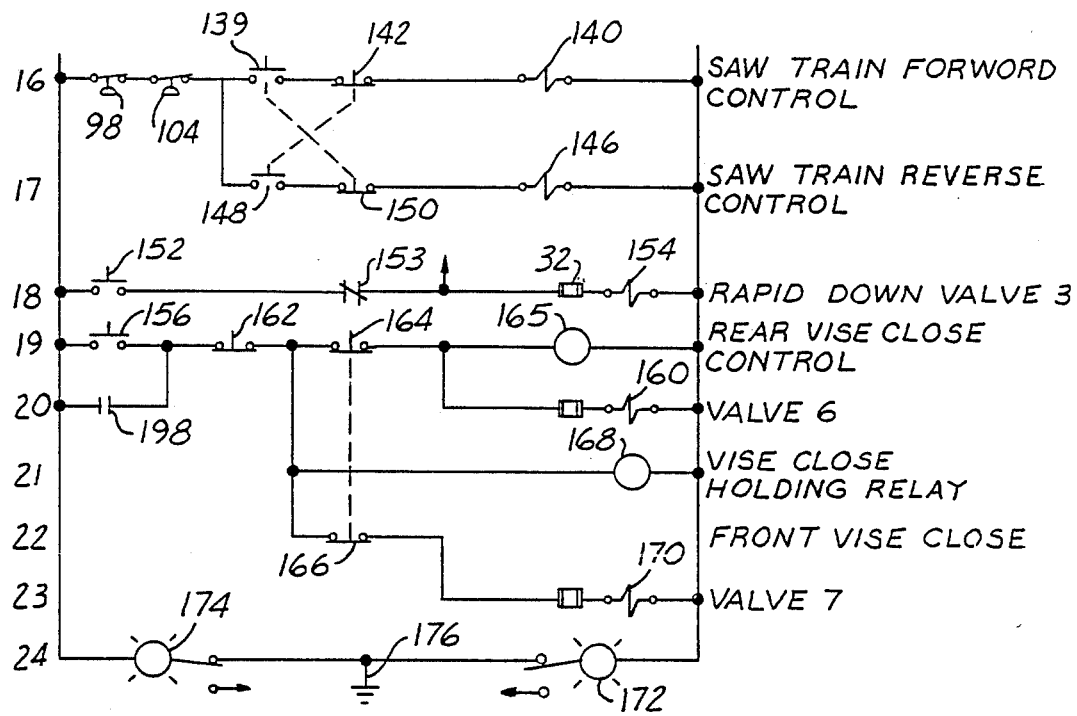
FIG. 6B is a schematic electrical diagram as a continuation of FIG. 6A.

FIGS. 6A and 6B are directed to a schematic electrical diagram corresponding to the simpler hydraulic circuit shown in FIG. 7. Referring to FIG. 6A, door disconnect switch 30 is shown for connection to a source of electrical power of 220 volts connected to the three fuses 32 and to the saw motor starter relay 34 to the power saw motor 420 shown in FIG. 3. A plurality of overload relay switches 36 are interposed. In this, and accompanying diagrams the number 32 in all instances is directed to protective fuses to avoid overloading a particular circuit. In the illustrative embodiment, the saw motor 420 is a 20 horsepower motor and includes the transformer 38 connected to the ammeter 40 in order to read the electrical power draw during operation of the power saw 436 driven by motor 420. This is through the intermediate transmission 426 leading to the output shaft 428, FIGS. 2 and 3.

The main power supply circuit is generally indicated 42, FIG. 6A and includes the motor starter relay 44 for the hydraulic pump motor M. Motor M is a 10 horsepower motor shown in FIGS. 7 and 9. The power goes down to the coolent pump starter relay 46, through the corresponding overload relay switches 36 to the coolent pump motor 48, which is rated ⅓ horsepower. Each of the elements 36 represent overload relay switches to protect the respective motors from overloads and from burning up as safety devices. The coolent pump motor 48 drives coolent pump 50 shown schematically in FIG. 4.

Figure 8A:
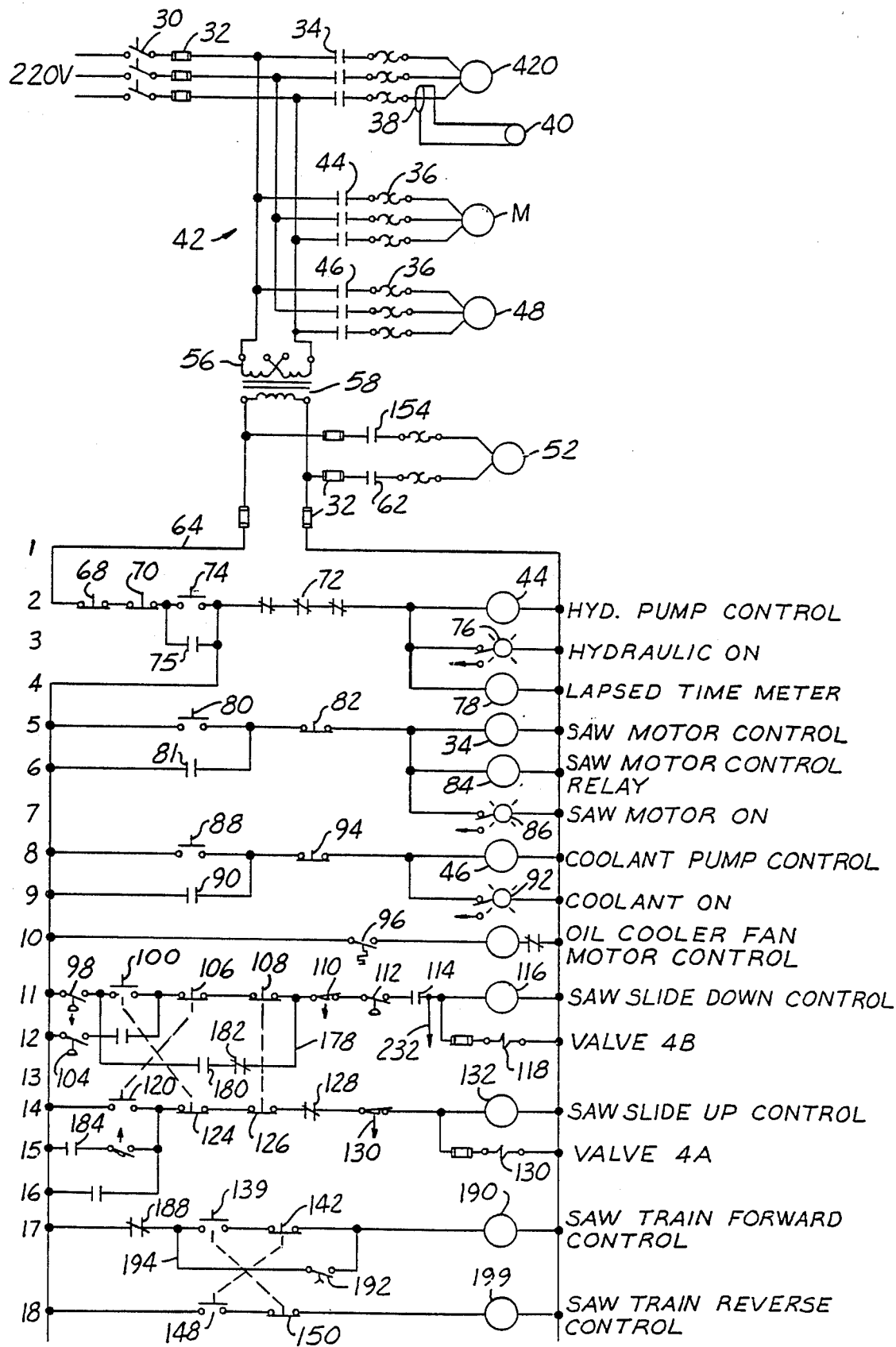
FIG. 8A is a schematic partial electrical circuit similar in many respects to the circuit set forth in FIGS. 6A and 6B including some modifications thereof in order to render the saw automatic, with consecutively numbered lines at the margin.

Electrical power continues to the starting relay 54 for the oil cooler fan motor 52 which is rated at ¼ horsepower motor operating at 220 volts in FIG. 6A, but as shown in FIG. 8A operates at 110 volts.

The main power supply 42 next goes to the step down transformer 56 to reduce the voltage to 110 volts at the secondary 58 controlling the electrical circuit 60. Control relay 62 is further interposed between the power source and the oil cooler fan motor 52, FIG. 6A.

The outlet from the secondary 58 of transformer 56 terminates in the main lines 64 and 66. Line numbers 2-14 are shown in FIG. 6A, merely for identification of particular lines of the circuit 60 sometimes referred to as a control circuit.

Lead 64 is connected to first push button 68 which functions as an emergency stop in case there is a need to shut the system down immediately for any reason. The second push button switch 70 is a hydraulic stop which disconnects power from the rest of the circuit and drops out the hydraulic motor M including relay 44 and the corresponding holding contacts. The third push button 74 is a hydraulic start push button connected to the starter relay 44. When it is pushed down it will complete and close the circuit to the holding relay 75 as the starter for the hydraulic motor M. The overload relays 72 are connected in series. If there is an overload of any of the motors 420, M or 48, any one of the overload relays 72 will open breaking the circuit. The "hydraulic on" light 76 indicates that the motor M is operative. The lapsed time meter 78 is employed to measure hours of saw operation for maintenance purposes as part of the branch circuit 66.

After the hydraulic start circuit in line 4 there shown a fourth push button switch 80 which is normally open and when momentarily closed closes the relay contacts 81. After switch 80 has opened power continues to the fifth button namely saw motor stop button 82 connected to the saw motor control relay 34. Saw motor stop button 82 is normally closed and the saw motor control relay 84 is energized. Light 86 indicates that the saw motor 420 is on.

In line 7, FIG. 6A the sixth push button 88 is normally open and when momentarily closed it closes the relay contacts 90, holding contacts for completing the circuit to the seventh push button 94. Button 94 is normally closed to the coolent pump motor control relay 46. Push button 94 when depressed deenergizes the coolent pump motor 48. Control relay 84 is used later in the circuit for indicating when the saw motor is in operation. Dropping down to line 9 there is provided a temperature switch 96 which is connected to the reservoir 12, FIG. 7, in order to sense its temperature and is so preset that when the set temperature is reached the switch closes and starts the oil cooler fan motor control 54 or control relay 62.

In line 10 there is shown a pressure switch 98 which is normally open and is employed to indicate when the rear vise cylinder C3 is closed. Power passes to the saw slide down push button 100 and on momentary closing the contact energizes the holding control relay 102 completing the circuit to push button 106 which is normally closed. In line 11 there is shown the normally open pressure switch 104 on the front vise cylinder C4 to indicate when the front vise 478 is closed. Switch 104 is arranged in parallel in a circuit for the switch 98. Either vise 476 or 478 when closed completes a circuit to the saw slide down push button 100. Push button 106 is normally closed and is a saw slide "up" button. When push button 106 is opened it breaks the circuit and stops the saw from downward feeding and at the same time closes the normally open switch 120 on line 12.

On line 10 there is provided the adjustable limit switch 110 which in the complete down position of the saw carriage 412 opens to break the circuit and the carriage stops. Switch 112 is a normally closed pressure switch which is closed when the lift cylinder C5, FIG. 7 is retracted. Normally open control relay 114 is connected to the saw motor control relay 84. The saw motor 420 must be turning for control relay 114 to close. Relay 114 is connected to the saw motor control relay 116. The branch circuit of line 11 includes solenoid 118 which is mounted on valve V4. Hydraulic fluid is directed through valve V4 to the cylinders 414.

In line 12 there is shown the normally open saw motor control switch 120 which closes when the switch 106 is opened. The two switches are connected together. Switch 120 closes with a momentary contact activating the holding relay contact 122 for feeding electrical power to the normally closed push button 124 for controlling the saw slide "up" movements. Power passes through the normally closed saw slide stop button 126 which is interlocked with the saw slide down button 108, FIG. 6A. Power is directed to the normally closed relay contact 128, providing a saw slide down interlock to keep the saw from going in two directions at the same time. The circuit includes the adjustable "up limit" switch 130 to automatically stop the saw carriage at the top of its feed movement. The limit switch 130 when closed directs current to the control relay 132 which is adapted to actuate the saw train for feeding a workpiece W into the saw when the saw slide carriage 42 is in an up position. The circuit after the up limit switch 130 includes solenoid 134 for energizing the valve V4 directing the flow of hydraulic fluid from pump P1 to one side of the cylinders 414 for feeding the saw carriage 412 and saw 436.

In line 14 of FIG. 6A there is shown the normally open push button switch 136 which is adapted for energizing the lift cylinder C5, FIG. 7 and which includes the solenoid 138 mounted upon the control valve V8 of FIG. 7.

SAW TRAIN CIRCUIT

Referring to FIG. 6B which is a continuation of the electrical circuit shown in FIG. 6A, in line 16 there is shown a pressure switch 98 which is connected with the rear vise cylinder C3 indicating that the rear vise 476 is open when pressure switch 98 closed. This closes the circuit to a second pressure switch 104 located on the front vise cylinder C4 which shows that the front vise 478 is open when the switch 104 is closed leading to the normally open push button 139 which controls forward movement of the saw train 442. Switch 139 when closed through switch 142 energizes the solenoid 140 of valve V5 for driving the saw train motor M1. The branch circuit on line 17 of FIG. 6B is energized for reverse feeding of the saw train. The branch circuit includes the normally open push button 148 which closes when the push button 142 is opened breaking the circuit to the saw train forward control. The branch circuit feeds through switch 148 to the push button switch 150 which is connected to the push button switch 139. When push button switch 139 is open push button switch 150 is closed directing power to the solenoid 146 on valve V5 for reversing the operation of the saw train motor M1.

The control of a rapid down control valve V3 includes the normally open push button switch 152 which is connected to the control relay contacts 153 and through a suitable fuse 32 to the solenoid 154 further shown in FIG. 7. The positioning of the movable element of valve V3 cuts off the back pressure and permits easy escape of exhaust hydraulic fluid from the cylinders 414 through valve V3 back to the reservoir 12 thereby providing for a rapid down feed movement of the saw carriage 412. In line 19 there is shown a normally open push button switch 156 which when closed operates holding relay 158 and is adapted to control the closing of the rear vise cylinder C3. Switch 162 is a "vise open" push button switch which is normally closed extending the circuit to the selector switch 164 which is normally closed. The selector switch 164 may be used for closing the rear vise 476, closing the front vise or for closing both vises as shown by the secondary front vise 478 close switch 166 which is connected to the selector switch 164.

With selector switch 164 closed for closing the rear vise cylinder C3 power is directed to the control relay 165 and in a branch circuit is directed to solenoid 160 which controls valve V6 to rear vise cylinder C3, FIG. 7. With the selector switch 166 also closed part of the circuit goes to the solenoid 170, line 23, on valve V7 for the front vise cylinder C4, FIG. 7. Line 24, includes the ground 176 for the circuit 60 together with a pair of ground fault switches 174 which light up if there is a fault in the grounding at 176. The pair of the lights 172 and 174 are ground fault indicator lights.

COMPLETE ELECTRICAL CIRCUIT

Figure 8B:
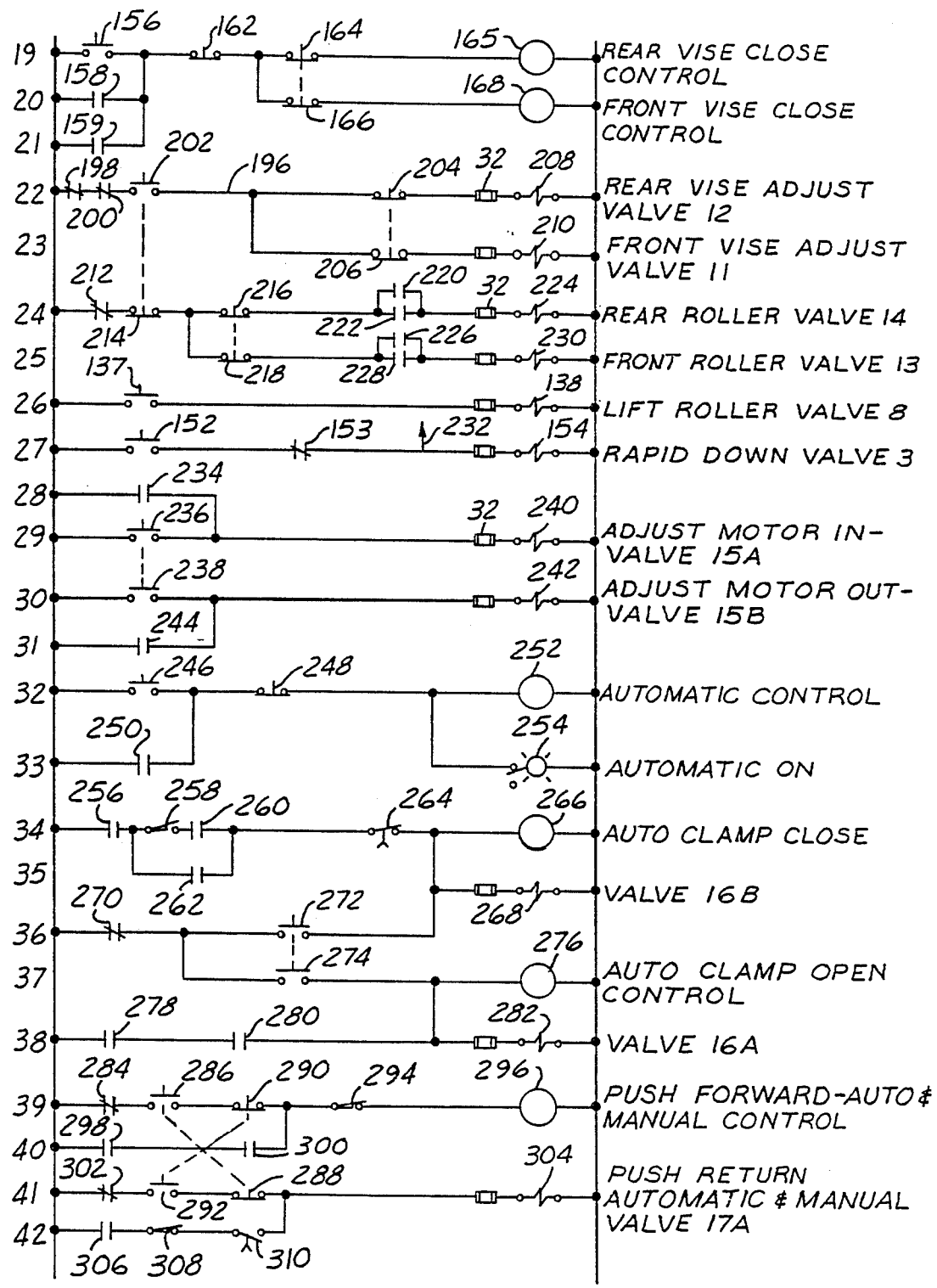
FIG. 8B is a schematic continuation of the electrical circuit shown in 8A, marginal portions being successively numbered for identification of components.
Figure 8C:
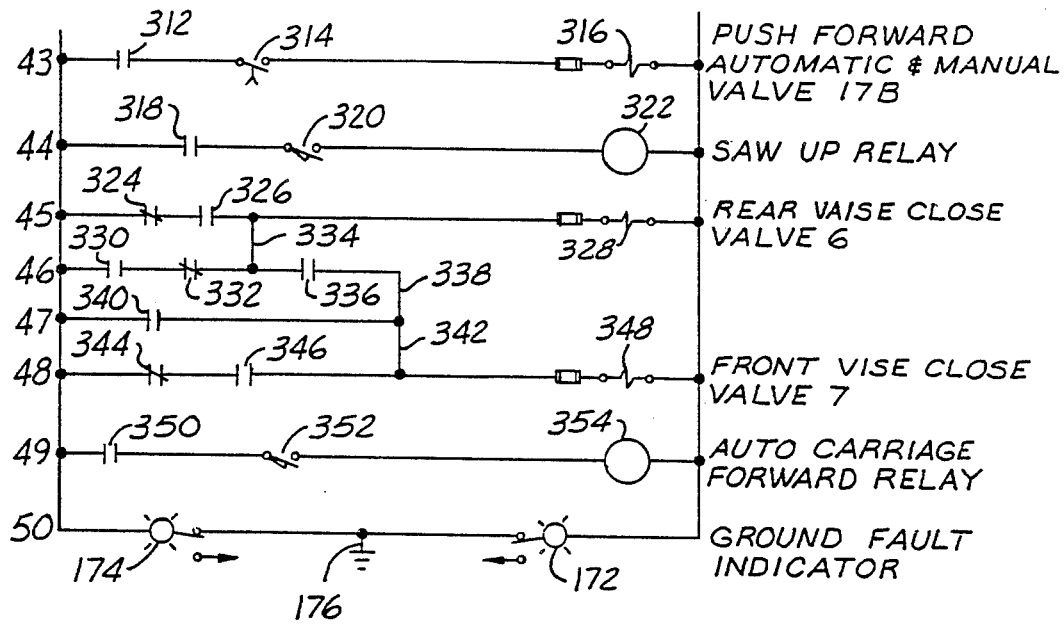
FIG. 8C is a schematic continuation of the electrical diagram shown in FIG. 8B completing the more involved electrical circuit for the automatic mode of operation, with consecutive numbered lines at the margin.

Essentially, FIGS. 8A, 8B and 8C are schematic electronic diagrams of the complete circuit for the power saw 402, FIG. 4, for automatic operation, and correspond to a great extent to FIGS. 6A and 6B but with certain additions there to provide for a more automatic operation of the present heavy-duty saw. With respect to lines 11 and 12 of FIG. 8A corresponding to lines 10 and 11 of FIG. 6A there has been added the branch circuit 178 which includes the normally open relay contact 180, closed when the auto carriage 462 is all the way forward. The auto carriage 462 mounts the AUTO vise cylinders C6 and C7 of FIG. 9, including the "AUTO PUSH" cylinders C8 for the carriage.

The branch circuit 178 further includes the normally closed contacts 182 which are added to show that the saw carriage 412 is down and wherein the contacts 182 will be open. When the saw carriage is not down the contacts 182 are in their normally closed conditions, FIG. 8A.

In line 15, corresponding to lines 12 and 13, FIG. 6A there has been added the normally open contacts 184 to tell the circuit when the "automatic mode" is selected and if so selected contacts 184 close feeding power to the limit switch 186 which completes the circuit when the saw slide is down thereby closing limit switch 186.

In line 17, FIG. 8A the pressure switches 98 and 104 of line 16, FIG. 6B have been replaced by the normally closed contact 188 referred to as a "vises open contact" with indicate when the vise cylinders C3 and C4 are open. The solenoid 140 from line 16 of FIG. 6B has been removed and replaced by the control relay 190, line 17, FIG. 8A.

The saw train forward circuit in line 17 further includes the branch circuit 194 connected to the normally open time delay relay contact 192. In the corresponding line 17 in FIG. 6B and line 18, FIG. 8A solenoid 146 has been removed and replaced by the control relay 199 regulating saw train reverse.

Lines 19, 20 and 21 of the electrical diagram, FIG. 8B correspond substantially to lines 19 and 20 of FIG. 6B except that control relay 159 has been added, line 21, FIG. 8B.

Referring to line 22, there are provided a normally closed control relay contact 198 and a normally closed relay contact 200. These contacts indicate when the vise cylinders C3 and C4 are open since they must be open for this portion of the circuit to function. The next switch is the normally open momentary contact switch 202 for the rear vise adjust circuit 196 also shown in FIG. 9. Switch 202 connects the normally closed selector switch 204, line 22 with fuse 32 and the solenoid 208 on valve V12. The valve V12 is connected to rear vise adjust cylinder C10, FIG. 9.

The selector switch 204 has an extension switch 206 corresponding to the FRONT VISE ADJUST, FIG. 9, which is connected to switch 204 so that the switches can be opened and closed in unison. Or you can select the REAR VISE ADJUST, the FRONT VISE ADJUST or both vises for adjust. With the FRONT VISE ADJUST selector switch 206 closed, power is direct to the solenoid 210 for the valve V11 which is connected to the front vise adjust cylinder C9.

Line 24, FIG. 8B, normally closed relay contacts 212 which indicates that the "vises are open" feed power through the normally closed contact switch 214. Switch 214 is the same and is connected to the switch 202, line 22, which is a momentary closed switch. Power is directed to the normally closed selector switch 216 which controls the rear rollers 452, FIG. 4. Selector switch 218, normally closed, is connected to selector switch 216 to control the front rollers 454.

With selector switch 216 closed there are interposed a pair of normally open relay contacts 220 and 222 and with either or both closed power through the fuse 32 is directed to solenoid 224 on valve V14. The valve V14 is connected to cylinder C11, REAR ROLLER, FIG. 9.

With selector switch 218 closed power is directed to the normally open relay contacts 226 and 228. When either or both of them are closed power is directed through the corresponding fuse to the solenoid 230 on valve V13. The valve V13 is connected to front roller cylinder C11, FIG. 9.

In connection with FIG. 8A, line 11 there is fragmentarily shown a portion of the branch circuit 232. This is continued to line 27 of the circuit shown in FIG. 8B.

In line 26, FIG. 8B, the normally open switch 137 is adapted to energize the solenoid 138 for operating the lift roller valve V8 and the lift cylinder C5, FIG. 9.

In line 27 there is shown the normally open switch 152 which through the normally closed relay switch 153 connects the branch circuit 232 and continues onto the solenoid 154, FIG. 9, previously described with respect to FIG. 7, for controlling valve V3 for FIG. 9. The valve V3 is a back pressure valve for the exhausting of pressure fluid from the cylinders 414 and permitting downward movement of the saw carriage 412.

In line 28 normally open relay contacts 234 are controlled and closed by the selector switch 236, line 29, bringing power to the solenoid 240 on valve V15 feeding pressurized hydraulic fluid to the saw train drive adjust motor M2, FIG. 9.

The second normally open selector switch 238 is connected to the selector switch 236 as a unit switch assembly and is adapted to control the adjust motor M2 for "out" feeding, whereas selector switch 236 controls the adjust motor for "in" feeding. The latter switch 238 through the normally open holding contact 244 will close completing the circuit of the solenoid 242. The solenoid 242 is connected to valve V15 for reversing the operation of the adjust motor M2 to the saw train as shown in FIG. 9.

AUTOMATIC CIRCUIT

When the power saw of FIGS. 1-5 is to be used in an "automatic mode" there are involved the hydraulic valves V16 and V17 and the cylinders C6, C7 and C8, FIG. 9. The normally open push button 246, line 32, closes the circuit to the "off" push button 248 with the control relay 250 holding the circuit closed when the push button 246 is released. This energizes the control relay 252 regulating automatic control of the saw. The branch circuit includes the light 254 indicating that the machine is in "automatic mode".

The normally open relay contacts 256 in line 34 are closed when the machine is in an "automatic mode" feeding power to the limit switch 258. Limit switch 258 indicates when the carriage 462 that mounts the auto vise cylinders C6 and C7 are all the way "forward" closing the limit switch 258. The normally open contacts 260 indicate when the saw slide 412 is in an "up" position, with the holding relay contacts 262 and closed completing the circuit to the time delay "relay off" switch 264 to the control relay 266 for the automatic clamp mode. The connected branch circuit leads to solenoid 268 for valve V16 for closing the auto vise cylinders C6 and C7, FIG. 9.

In line 36 there is provided a normally closed relay contact 270. The contact 270 remains closed when the machine is "out of automatic". The contact 270 is open when the machine is in an "automatic" mode. The contact 270 is connected to the n/o selector switch 272 which controls the solenoid 268 for closing the auto vise cylinders C6 and C7.

The branch circuit off of line 36 leads to the second n/o selector switch 274 which is connected to the first selector switch 272 and to the control relay 276. Control relay 276 is a time delay relay which through a lead to line 38 connects solenoid 282 on the valve V16 controlling the AUTO VISE cylinders C6 and C7. In line 38 the contacts 278 are normally open. They close when the machine is in "automatic mode". Likewise, the normally open contacts 280 close when the machine is in "automatic mode" thereby establishing power to solenoid 282 on valve V16 for the automatic control of the VISE cylinders C6 and C7, FIG. 9.

The "PUSH FORWARD" automatic control on line 39, FIG. 8B includes normally closed contacts 284 connected to the push button 286, normally open, and connected and interlocked with the normally closed contacts 288 in line 41. With switch 286 closed, power is directed to the normally closed push button "return switch" 290 which is connected to the normally open push button 292 in line 41. The power through switch 290 connects to limit switch 294 which indicates that the auto push cylinder C8 is "all the way forward" energizing control relay 296 which is a time delay relay.

Normally open contacts 298 in line 40 close when the machine is in an automatic mode and the normally open contacts 300 close when the saw carriage is in a "up" position. In line 41, the normally closed contacts 302 are opened when the machine is in an "automatic mode" but closed when the machine is not in an automatic mode. When the machine is not in an "automatic mode" power goes to switch 292 which when closed feeds power to the normally closed switch 288. The switch 288 is connected to solenoid 304 on the other end of the valve V17 for controlling the auto push cylinder C8 for an automatic return movement of carriage 462. The normally open relay contacts 306 in line 42 are closed when the saw is in an "automatic mode" and the limit switch 308 is actuated when the carriage 462 is returned to its "back" position. This powers the time delay relay 310.

In line 43 of the electrical diagram, FIG. 8C, normally open contacts 312 are closed when the machine is in an "automatic mode". When contacts 312 and the time delay contacts 314 are closed the solenoid 316 of valve V17 is energized and controls the auto push cylinder C8, FIG. 9.

In line 44, there is shown the normally open contacts 318 which indicates when the vise cylinders C6 and C7 are closed. When closed the contacts 318 connect the circuit to the limit switch 320 which is normally open until the saw carriage is in an "up" position for energizing the control relay 322, referred to as a "saw up" relay.

The normally closed contacts 324 in line 45, FIG. 8C, are open when the saw is in an "automatic mode" feeding power to the normally open contacts 326 which when closed power the solenoid 328 of the valve V6. The valve V6 is connected to the rear vise cylinder C3, FIG. 9.

In line 46 the normally open contacts 330 are closed when an "automatic mode" is selected providing power to the normally closed contacts 332 including the branch circuit 334 that connects the auto contact 336, which is normally open but which closes when the machine is in an "automatic mode". The circuit terminates in the branch circuit 338 connecting the normally open contacts 340 and the branch circuit 342 connecting the normally closed contacts 344 in line 48. Contact 346 is a normally open contact and when closed provides power to the solenoid 348. The solenoid 348 is connected to the valve V7 controlling the front vise cylinder C4 of FIG. 9.

In line 49, the normally open contacts 350 are closed when the saw is in "automatic mode". When the normally opened limit switch 352 is closed power is directed across the closed contacts and switch to the control relay 354 for the auto carriage forward relay. The circuit terminates in line 50 with the ground 176 and the pair of illuminated ground fault indicators 172 and 174.

GENERAL OPERATION

Referring to FIGS. 7 and 9, oil is drawn from the hydraulic tank 12 and through the filter 14 by pumps P1 and P2. Pump P2 is used for clamping and holding, thus it is a very low volume pump. The relief valve V10 is set at 500 PSI. Its setting can be set higher or lower, but it has been found that the saw works well at this setting. At 500 PSI everything works well without causing excess heat.

Pump P1 is a higher volume pump, with the relief valve V9 set at 750 to 1,000 PSI. This pump is used to move the steel W into position on the saw base and is used in the feed of the saw carriage 412.

The valves used to control the saw carriage 412 are as follows. Valves V1 and V4 are used in feeding the saw carriage "down". Valve V2 is used as a counter balance valve to hold the carriage up in the neutral position. Valve V3 is used as a rapid down valve. Valve V19 is used as a back flow check and valve V20 is used as load check.

To use "rapid down", the rapid valve V3 and the feed valve V4 are shifted. The rapid down valve V3 is shifted from closed to open by solenoid 154 and the feed valve V4 is shifted by solenoid 134 for the pressure port goes to the B port and port A goes to the tank port. This lets hydraulic fluid or oil through the valve V4 and opens one of the load check valves V20. Oil then goes to the cylinders 414 to push the pistons down. The cylinder rods 416, FIG. 5, are connected to the carriage 412 of the saw. The oil on the blind side of the cylinders is forced out and opens the counter balance valve V2 by means of the pilot pipe shown in DASH lines. The counter balance valve V2 is set at 10-100 PSI more then the weight of the carriage 412. The coil can not go through the feed valve V4 because of check valve V20. Very little oil will go through valve V1 because of its higher back pressure. So the oil must go through the rapid down valve V3 which is open to tank 12. This will let the saw carriage 412 descend at a rapid rate.

The feed of the saw carriage 412 is done with the feed valve V4 and the speed valve V3. To start the feed down the feed valve V4 is shifted by one of its solenoids 134 as in the rapid mode. The hydraulic fluid is directed to the B port and the A port is connected to the tank port. Hydraulic fluid under pressure opens the load check valve V20 and the fluid is directed to the rod end of the cylinders 414, forcing the pistons down. This forces the oil out of the blind end of each cylinder. The oil is stopped from going through the feed valve V4 by check valve V20. The oil is directed through the counter balance valve V2, which has a setting of 10-100 PSI higher than the carriage. After the oil goes through the counter balance valve V2 it is directed through the feed valve V1 which is a flow control valve. The oil can not go through the rapid down valve V3 since it is closed and will block the oil. Oil directed through speed valve V1, which is a temperature and pressure compensated flow control is to regulate the speed at which the carriage descends. Other flow controls will work but not as well. Valves V1 and V2 also put a back pressure on cylinders 414 which gives good control of the saw carriage 412.

The present power saw with the improved hydraulic and electrical circuits can cut steel that normally cannot be cut with current conventional saws.

Having described my invention, reference should now be had to the following claims.

I claim:

1. In a heavy-duty saw assembly having a base, a pair of spaced columns thereon, a saw feed carriage guidably mounted upon the columns upon vertical axes and supporting a power-driven saw rotatable upon a horizontal axis a hydraulic lift feed cylinder assembly within each column and connected to said saw feed carriage, an elongated roller train extending at right angles to said base and connected thereto, including a plurality of spaced transverse rollers, a continuous sprocket chain connected to the rollers for selective rotation in unison for intermittently feeding an elongated workpiece onto said base transversely of and under the saw, spaced normally open rear and front hydraulic vises adjustably mounted upon said base rearwardly and forwardly of the saw respectively adpated to selectively grip the work, and a pair of spaced manually rotatable lead screws journaled upon the base adapted for connection to said vises respectively, the improvement of hydraulic circuit means therefor comprising:

first and second hydraulic circuits;

first and second power-operated hydraulic pumps for feeding hydraulic fluid into said circuits respectively;

a four-way, three-position, spring centered, solenoid-activated saw feed carriage first valve in said first circuit having an outlet connected to the lift feed cylinder assemblies for selectively raising and lowering the saw feed carriage;

a reversible hydraulic motor having an output drive connected to said sprocket chain;

a four-way, three-position, spring centered, solenoid-activated second valve in said first hydraulic circuit having an output connected to said hydraulic motor;

a two-position, four-way, spring offset, solenoid-operated third valve in said second hydraulic circuit having an outlet connected to said rear vise;

said saw feed carriage being initially retracted, activation of said second four-way valve and hydraulic motor first actuating said rollers;

activation of said third valve closing said rear vise upon the work; and successive actuating of said first valve actuating said cylinder assemblies for feeding the saw to and through said work.

2. In the heavy-duty saw assemblies of claim 1, further comprising an electrical circuit including a power source connected to the respective solenoids of said valves;

there being an electrical interlock between the solenoids of said first, second and third valves whereby the saw train is operative only when the rear vise is open and the saw carriage is operative for downward feed only when the rear vise is closed upon the work.

3. In the heavy-duty saw assembly of claim 1, further comprising an adjustable pressure relief valve interposed in said first hydraulic circuit set at a pressure in the range of 750 to 1000 psi; and an adjustable pressure relief valve interposed in said second hydraulic circuit set at a pressure of about 500 psi, approximately.

4. In the heavy-duty saw assembly of claim 1, further comprising a two position four-way spring offset solenoid operated fourth valve in said second hydraulic circuit and connected to said front vise;

said front vise adapted for gripping the work simultaneously with initial downward feeding of said saw feed carriage and saw;

and further adapted to release the cut work before retraction of the saw feed carriage.

5. In the heavy-duty saw assembly of claim 4, further comprising an electrical circuit including a power source connected to the respective solenoids of said valves;

there being an electrical interlock between solenoids of said first, second and third valves whereby the saw train is operative only when the rear vise is open, and the saw feed carriage is operative for downward feed only when the rear vise is closed upon the work;

there being a further electrical interlock in the circuit between the solenoids of the first and fourth valves whereby the front vise is open before said saw train is energized and closed upon the work before the saw feed carriage and saw feeds into the work.

6. In the heavy-duty saw assembly of claim 4, further comprising a first drive gear adjustably keyed upon the output drive of said hydraulic motor and rotatable therewith;

a first driven gear upon one of said lead screws;

a rear vise adjust cylinder on said base having a reciprocal piston rod connected to said first gear, on activation of said rear vise adjust cylinder advancing said first drive gear into mesh with said first driven gear for further advancement of said rear vise against said work.

7. In the heavy-duty saw assembly of claim 6, further comprising a four-way, spring-offset, solenoid-controlled, two-position valve connected into said second hydraulic circuit and having an output connected to said rear vise adjust cylinder.

8. In the heavy-duty saw assembly of claim 6, further comprising a second drive gear adjustably keyed upon the output drive of said hydraulic motor;

a second driven gear upon the other of said lead screws;

a front vise adjust cylinder on said base having a reciprocal piston rod connected to said second drive gear, on activation of said front vise adjust cylinder advancing said second drive gear into mesh with said second driven gear for further advancement of said front vise against said work.

9. In the heavy-duty saw assembly of claim 8, further comprising a four-way, spring-offset, solenoid-controlled, two-position valve connected to said second hydraulic circuit and having an output connected to said front vise adjust cylinder.

10. In the heavy-duty saw assembly of claim 4, further comprising a pair of parallel interconnected rear rollers journaled upon said base rearwardly of the saw;

a first drive shaft journaled upon said base and connected to said rear rollers;

a third drive gear adjustably keyed upon the output drive of said hydraulic motor;

a third driven gear upon said first drive shaft;

a rear roller control cylinder on said base having a reciprocal piston rod connected to said third drive gear, on activation of said roller control cylinder advancing said third drive gear into mesh with said third driven gear for rotating said rear rollers, for feeding a shortened workpiece under the saw.

11. In the heavy-duty saw assembly of claim 10, further comprising a four-way, spring-offset, solenoid-controlled, two-position valve connected into said second hydraulic circuit and having an output connected to said rear roller control cylinder.

12. In the heavy-duty saw assembly of claim 10, further comprising a pair of parallel interconnected front rollers journaled upon said base:

a second drive shaft journaled upon said base and connected to said front rollers;

a fourth drive gear adjustably keyed upon the output drive of said hydraulic motor and rotatable therewith;

a fourth driven gear upon said second drive shaft;

a front roller control cylinder on said base having a reciprocal piston rod connected to said fourth drive gear, on activation of said front roller control cylinder advancing said fourth drive gear into mesh with said fourth driven gear upon said second drive shaft.

13. In the heavy-duty saw assembly of claim 12, further comprising a four-way, two-position, spring-offset, solenoid-controlled valve in said second hydraulic circuit having an output connected to said front roller control cylinder.

14. In the heavy-duty saw assembly of claim 1, further comprising a normally retracted lift cylinder assembly in advance of said rollers arranged centrally thereof including an upright piston rod in registry with the leading end of said work;

a four-way spring-offset, solenoid-controlled valve in said second hydraulic circuit and having an outlet connected to said lift cylinder assembly;

when activated adapted to elevate the leading end of said work to facilitate its entry into the rear vise.

15. In the heavy-duty saw assembly of claim 14, each of said four-way valves having a central blocking position and a pair of exterior positions for selectively feeding pressurized liquid to one of a pair of outlets;

each of said two position four-way valves being normally open for retracting said rear and front vises and lift cylinder assembly.

16. In the heavy-duty saw assembly of claim 1, further comprising a two position, spring-offset, normally closed pilot operated counterbalance valve in said first hydraulic circuit, downstream of the hydraulic connection between the first valve and said cylinder assemblies, normally blocking the exhaust of pressure liquid from said cylinder assemblies holding the saw carriage in an up neutral position, and in one position, on reversal of said first valve exhausting liquid under a back pressure preventing the saw from dropping rapidly and maintaining a constant downward feeding of the saw carriage.

17. In the heavy-duty saw assembly of claim 16, further comprising a temperature and pressure compensated variable exhaust flow control valve connected to the outlet of said counterbalance valve for creating a back pressure upon said cylinder assemblies for increased fine control of the saw carriage.

18. In the heavy-duty saw assembly of claim 16, further comprising a two-position four-way spring offset solenoid activated valve, connected to the outlet of said counterbalance valve normally open to exhaust for feeding the saw carriage down at a rapid rate without back pressures, and movable to a second position on activation of its solenoid for applying a back pressure to the exhaust from the counterbalance valve for slowing downward movement of said saw carriage.

19. In the heavy-duty saw assembly of claim 1, further comprising:
the connection of said hydraulic motor to the sprocket chain including a first drive shaft journaled upon said base extending at right angles to said sprocket chain at one end thereof and operably connected to said sprocket chain;
said hydraulic motor output drive being operably connected to said first drive shaft.

20. In the heavy-duty saw assembly of claim 1, further comprising:
the connection of said hydraulic motor to the sprocket chain including a first drive shaft journaled upon said base extending at right angles to said sprocket chain at one end thereof;
longitudinally spaced drive and driven sprockets secured upon said drive shaft, with said driven sprocket operably engaging said sprocket chain; and
a sprocket upon said hydraulic motor output drive operably engaging a sprocket chain connected to said drive sprocket.

21. In the heavy-duty saw assembly of claim 1, further comprising upon said saw train a pair of spaced guide rods;
an automatic work feed carriage reciprocally mounted upon said guide rods, having an adjustable retracted position and an advanced position;
a pair of opposed transverse vise cylinders mounted upon said work feed carriage including a pair of normally retracted grips overlying said rollers, when said work feed carriage is retracted, adapted to operatively engage the work and upon forward movement of the work feed carriage adapted to advance the work over said rollers onto said vises to underlie said saw.

22. In the heavy-duty saw assembly of claim 21, further comprising first hydraulic means to selectively advance and retract said work feed carriage.

23. In the heavy-duty saw assembly of claim 22, said first hydraulic means including a cylinder assembly underlying said saw train and secured thereto and including a reciprocal piston rod connected to said work feed carriage.

24. In the heavy-duty saw assembly of claim 1, further comprising an automatic work feed carriage reciprocally mounted upon said saw train having an adjustable retracted position and an advanced position;
a pair of opposed transverse vise cylinders mounted upon said work feed carriage overlying said rollers and adapted when the work feed carriage is retracted to operatively grip the work, and upon forward movement of the work feed carriage, advance the work over said rollers onto said vises to underlie said saw.

25. In the heavy-duty saw assembly of claim 24, further comprising first hydraulic means to selectively advance and retract said work feed carriage.

26. In the heavy-duty saw assembly of claim 25, said first hydraulic means including a cylinder assembly underlying said saw train and secured thereto and including a reciprocal piston rod connected to said work feed carriage.

27. In the heavy-duty saw assembly of claim 26, further comprising a four-way, three-position, spring-centered, solenoid-activated fourth vise control valve in said first hydraulic circuit having an output connected to said vise cylinders respectively; and
a four-way, three-position, spring-centered, solenoid-activated fifth valve in said first hydraulic circuit and connected to said work feed carriage feed cylinder assembly.

28. In a heavy-duty saw assembly having a base, a pair of spaced columns thereon, a saw feed carriage guidably mounted upon the columns upon vertical axes and supporting a power-driven saw rotatable upon a horizontal axis, a hydraulic lift feed cylinder assembly within each column and connected to said carriage, an elongated saw train extending at right angles to said base and connected thereto, including a plurality of spaced transverse rollers, a continuous sprocket chain connected to the rollers for selective rotation in unison for intermittently feeding an elongated workpiece onto said base transversely of and under the saw, spaced normally open rear and front hydraulic vises adjustably mounted upon said base rearwardly and forwardly of the saw respectively adapted to selectively grip the work, and a pair of spaced manually rotatable lead screws journaled upon the base adapted for connection to said vises respectively, the improvement of an electrical circuit therefore comprising:
a hydraulic pump motor and pump for feeding pressurized liquids selectively to said lift feed cylinder assembly for raising and lowering the saw feed carriage;
a four-way solenoid controlled first valve controlling the operation of said cylinder assembly;
the pump feeding pressurized liquid to a reversible hydraulic motor for selectively driving the sprocket train;
a four-way solenoid controlled second valve controlling the hydraulic motor;
a four-way solenoid controlled third valve connected to the rear vise;
electrical connections in said circuit to successively open the circuit to the third valve maintaining the rear vise open and energizing the second valve to operate the hydraulic motor to activate the saw train advancing the work onto said base and into the rear vise;
electrical switch means connected to energize the third valve to close the rear vise upon the work; and
switch means successively activated to energize the first control valve to feed the saw carriage down and the saw down through the workpiece.

29. In the heavy-duty saw of claim 28, further comprising:
a four-way solenoid controlled fourth valve connected to the front vise;
said electrical connections in said circuit maintaining the circuit open to the fourth valve maintaining the first vise open; and electric switch means connected to energize the fourth valve to close the front vise simultaneously with closing of the rear vise thereby clamping the work upon the base under the saw for downward advancement of the saw carriage.

30. In the heavy-duty saw of claim 29, further comprising:
electric switch means in the circuit to reverse the third and fourth control valves opening the front and rear vises to disengage the workpiece and a portion cut from said workpiece; and
switch means connected to said second valve for reversing the second valve automatically retracting the saw carriage.

31. In the heavy-duty saw of claim 28, further comprising:
an upright lift cylinder including a normally retracted lift roller upon said base in advance of the rear vise together with a four-way solenoid controlled valve connected to a source of pressure liquid and to said lift cylinder; and
a normally open switch means in said circuit connected to said fifth valve, when activated controlling the flow of pressurized liquid to the lift cylinder operatively engaging and lifting the workpiece to facilitate its entry into the vises.

32. In the heavy-duty saw of claim 28, further comprising:
a two-position spring off-set normally open solenoid operated valve receiving exhaust liquid from the cylinder assemblies on downward feed of the saw carriage for a substantially free flow of exhaust liquids and for a fast down feed of the saw carriage; and
switch means in said circuit connected to the solenoid of the valve for reversing the valve for applying a back pressure to said exhaust liquid for a controlled downward feed of said saw carriage.

33. In the heavy-duty saw of claim 28, further comprising:
the saw further including an automatic work feed carriage reciprocally mounted upon the saw train having retracted and advanced positions and a reversible auto push cylinder assembly connected to the work feed carriage, a pair of opposed transverse vise cylinders mounted upon the work feed carriage having a pair of normally retracted grips adapted to operatively engage a workpiece;
a four-way spring biased solenoid operated control valve for selectively feeding pressurized liquid to the auto push cylinder assembly;
a four-way spring biased solenoid operated control valve for selectively feeding pressurized liquid to said vise cylinders;
a normally open switch means in said circuit connected to said valve for feeding pressurized fluid to the auto push cylinder assembly;
a normally open switch means in said circuit connected to said valve for feeding pressurized to said vise cylinders; and
an electronic interlock in said circuit between the solenoids of said valves for feeding pressurized fluid to the auto push cylinder assembly and the vise cylinders whereby the automatic vise cylinders close upon the work when the work feed carriage is retracted and the auto push cylinder assembly is energized to feed the work feed carriage toward the base.

34. In the heavy-duty saw of claim 28, further comprising:
the saw assembly further including a front vise adjust cylinder for connecting the output of said hydraulic motor to one of said lead screws;
a four-way solenoid controlled hydraulic feed valve connected to the front vise adjust cylinder; and
a normally open switch means in said circuit and connected to said valve connected to the front vise adjust cylinder for energizing the front vise adjust cylinder to rotatively adjust said lead screw.

35. In the heavy-duty saw of claim 28, further comprising:
the saw assembly further including a rear vise adjust cylinder for connecting the output of said hydraulic motor to one of said lead screws;
a four-way solenoid controlled hydraulic feed valve connected to the rear vise adjust cylinder; and
a normally open switch means in said circuit and connected to said valve connected to the rear vise adjust cylinder for energizing the front vise adjust cylinder.

36. In the heavy-duty saw of claim 28, further comprising:
said saw assembly including a pair of rear rollers journaled upon said base in advance of the saw, a rear roller control cylinder on said base adapted for connecting the output of said hydraulic motor to said rear rollers;
a four-way spring biased solenoid operated valve for feeding pressurized liquid to the rear roller control cylinder; and
switch means in said circuit connected to the solenoid of the valve for feeding pressurized fluid to the rear roller control cylinder for energizing said rear roller control cylinder.

37. In the heavy-duty saw of claim 28, further comprising:
said saw assembly including a pair of front rollers journaled upon said base outwardly of the saw, a front roller control cylinder on said base adapted for connecting the output of said hydraulic motor to said front rollers;
a four-way solenoid operated valve for feeding pressurized fluid to the front roller control cylinder; and
switch means in said circuit connected to said valve for feeding pressurized fluid to the front roller control cylinder for energizing said front roller cylinder.

* * * * *